United States Patent [19]

Brown et al.

[11] 4,176,328
[45] Nov. 27, 1979

[54] DC COUPLED BI-PHASE MODULATOR

[75] Inventors: Kenneth H. Brown, Scottsdale; John W. Shepard, Chandler, both of Ariz.

[73] Assignee: Motorola, Inc., Schaumburg, Ill.

[21] Appl. No.: 910,402

[22] Filed: May 30, 1978

[51] Int. Cl.² .......................................... H04L 27/20
[52] U.S. Cl. ................................. 332/16 T; 325/161; 332/23 R
[58] Field of Search ............... 332/16 R, 16 T, 9 T, 332/23 R; 325/145, 30, 45, 161, 163; 328/155; 307/262

[56] References Cited

U.S. PATENT DOCUMENTS

| | | | |
|---|---|---|---|
| 3,170,125 | 2/1965 | Thompson | 332/1 |
| 3,815,052 | 6/1974 | Watatani et al. | 332/16 T |
| 3,821,631 | 6/1974 | Betke | 307/262 X |
| 3,995,235 | 11/1976 | Kaplan | 332/23 R |
| 3,999,149 | 12/1976 | Vetrecht | 332/16 T |
| 4,052,679 | 10/1977 | Hosoya | 328/155 |

Primary Examiner—Siegfried H. Grimm
Attorney, Agent, or Firm—Eugene A. Parsons

[57] ABSTRACT

A switching circuit of the type including a plurality of differential amplifiers on an IC chip and having a linear operating range about a bias point, having an operational amplifier connected as a comparator and coupled to an input thereof to receive a modulating signal, one input of the comparator being connected to the bias point so that the output thereof applied to the switching circuit varies about the bias point within the linear range of the switching circuit, and means coupling the signal to be modulated to a second input of the switching circuit so that the signal is bi-phase modulated by the modulating signal with substantial carrier suppression and significantly reduced harmonics.

6 Claims, 1 Drawing Figure

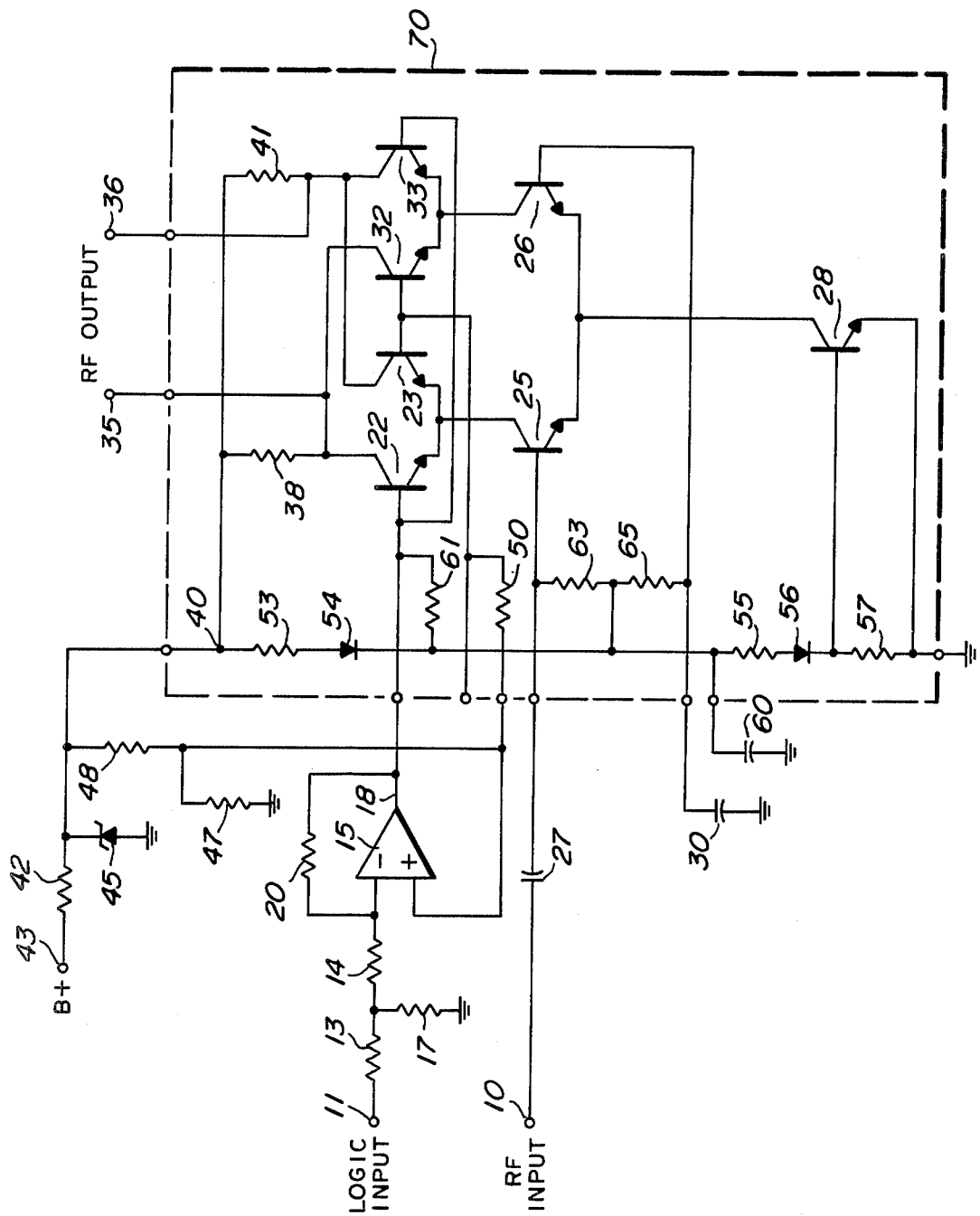

DC COUPLED BI-PHASE MODULATOR

BACKGROUND OF THE INVENTION

Some previous circuits use digital logic to bi-phase modulate a carrier. In these circuits, the RF output signal from the logic generally is a square wave which has very large harmonics (especially the third harmonic). Also, these circuits utilize many parts and require substantial power for the operation thereof and do not incorporate DC coupling.

SUMMARY OF THE INVENTION

The present invention pertains to a DC coupled bi-phase modulator including a switching circuit having a signal input and output, a bias input and a control input, a comparator having an output DC coupled to the control input, a reference input coupled to the bias input and a signal input for receiving a modulating signal, and biasing circuitry coupled to the bias input for causing the switching circuit to operate within a linear range and the comparing means providing a control signal to the switching means which varies about the bias so that the output is a sine wave with harmonics significantly reduced.

It is an object of the present invention to provide a new and improved DC coupled bi-phase modulator.

It is a further object of the present invention to provide a DC coupled bi-phase modulator utilizing multiple differential amplifiers on an IC chip for a switching circuit and an operational amplifier as a comparing circuit so that the circuit has improved carrier suppression, temperature stability, and significantly reduced output harmonics.

These and other objects of this invention will become apparent to those skilled in the art upon consideration of the accompanying specification, claims and drawing.

BRIEF DESCRIPTION OF THE DRAWING

The single FIGURE is a schematic representation of a DC coupled bi-phase modulator embodying the present invention.

DESCRIPTION OF THE PREFERRED EMBODIMENT

The number 10 indicates an input terminal adapted to receive a signal to be modulated, such as an RF signal or other sinusoidal carrier. The number 11 indicates a second input terminal adapted to receive a modulating signal, such as digital data or the like. The input terminal 11 is connected through series connected resistors 13 and 14 to the inverting terminal of an operational amplifier 15. The operational amplifier 15 may be, for example, the type of operational amplifier sold under the Part No. LM118. The junction of the resistors 13 and 14 is connected through a resistor 17 to ground. The operational amplifier 15 has an output 18 which is connected through a resistor 20 to the inverting input thereof. The output 18 is also connected to the base of a transistor 22. The transistor 22 and a second transistor 23 form a differential pair with the emitters connected together and directly connected to the collector of a transistor 25. The base of the transistor 25 is coupled through a capacitor 27 to the input terminal 10. The transistor 25 and a second transistor 26 form a differential pair with the emitters connected together and directly connected to the collector of a transistor 28. The base of the transistor 26 is coupled through a capacitor 30 to ground and the collector is connected to the common connected emitters of a differential pair of transistors 32 and 33. The base of the transistor 33 is connected directly to the base of the transistor 22 and the base of the transistor 32 is connected directly to the base of the transistor 23. The collectors of the transistors 22 and 32 are connected together and to an output terminal 35. The collectors of the transistors 23 and 33 are connected together and to an output terminal 36. The common collectors of the transistors 22 and 32 are also connected through a resistor 38 to a junction 40. The common collectors of the transistors 23 and 33 are connected through a resistor 41 to the terminal 40. The terminal 40 is connected through a current limiting resistor 42 to a terminal 43 adapted to have a positive source of voltage connected thereto for supplying energy to the system. A Zener diode 45 is connected from the terminal 40 to ground to maintain the voltage level at the terminal 40 constant.

A biasing circuit, including a pair of resistors 47 and 48 connected in series, is connected from the terminal 40 to ground. The junction of the resistors 47 and 48 is connected directly to the noninverting terminal of the operational amplifier 15 and through a resistor 50 to the common connected bases of the transistors 23 and 32. Various levels of DC supply voltage are obtained by connecting the terminal 40 through the series combination of a resistor 53, a diode 54, a resistor 55, a diode 56 and a resistor 57 to ground. The junction of the diode 54 and the resistor 55 is connected through a capacitor 60 to ground, through a resistor 61 to the common bases of the transistors 22 and 33, through a resistor 63 to the base of the transistor 25 and through a resistor 65 to the base of the transistor 26. The junction of the diode 56 and the resistor 57 is connected to the base of the transistor 28 and the emitter of the transistor 28 is connected directly to ground. The transistors 22, 23, 25, 26, 28, 32 and 33, along with some of the circuitry for providing energy thereto, form a differential amplifier which may be formed as a single IC chip. This differential amplifier is outlined with a dotted line 70. The differential amplifier 70 may be, for example, the amplifier circuit disclosed in U.S. Pat. No. 3,452,289, entitled "Differential Amplifier Circuits", issued June 24, 1969, and assigned to the same assignee (sold by Motorola, Inc. under the Part No. MIC236) or a similar type of differential amplifier circuit with similar characteristics.

In the operation of the DC coupled bi-phase modulator illustrated in the FIGURE, the resistors 47 and 48 form a bias network which provides a bias voltage at the common connected bases of the transistors 23 and 32 to bias the differential amplifier circuit at an operating point within the linear range of operation of the circuit. The resistors 47 and 48 also set the reference voltage on the operational amplifier 15. The gain of the operational amplifier 15 is set by the ratio of the resistor 20 to the resistor 14 and is set to provide an output signal which varies about the reference, or bias, voltage so as to maintain the differential amplifier operating within the linear range. In one specific example of the circuitry wherein the bi-phase modulator operates as described, the various components have the following values:

| Resistors | Ohms |
|---|---|
| 13 | 1.2 K |

-continued

| | |
|---|---|
| 14 | 15 K |
| 17 | 3 K |
| 20 | 3.3 K |
| 38 | 600 |
| 41 | 600 |
| 42 | 100 |
| 47 | 700 |
| 48 | 1 K |
| 50 | 1 K |
| 53 | 4.3 K |
| 55 | 3 K |
| 57 | 1.3 K |
| 61 | 1 K |
| 63 | 1 K |
| 65 | 1 K |

| Capacitors | Mfd |
|---|---|
| 27 | .01 |
| 30 | .01 |
| 60 | 33 |

| Zener Diode | |
|---|---|
| 45 | IN833 |
| B+ | 9 volts |

In the specific embodiment set forth, the gain of the operational amplifier 15 is 0.22 referenced to the bias on the noninverting input thereof. This bias is set by the resistors 47 and 48 to yield 2.7 volts. With no modulation input signal, or a zero data level, the output of the operational amplifier 15 is 3.3 volts (2.7 volts plus 0.22 times 2.7 volts). The internal bias of the differential amplifier, which sets the base voltage of the common connected bases of transistors 22 and 33, is set to 3 volts. The base voltage of the common connected bases of transistors 23 and 32 is set by the bias voltage provided by the resistors 47 and 48. Under these conditions transistors 22 and 33 conduct while transistors 23 and 32 are shut off. The carrier or RF output signal on output terminal 35 is in phase with the carrier or RF input signal at terminal 10 and the carrier or RF output signal on the output terminal 36 is 180° out-of-phase with the carrier of RF input signal at the terminal 10.

Assuming that the input data varies between 0 and 5 volts, when 5 volts is applied to the input terminal 11 the operational amplifier 15 output at terminal 18 changes to 2.5 volts. This reduction in output level causes transistors 22 and 33 to cutoff and transistors 23 and 32 to conduct. The carrier or RF output signal on terminal 35 is 180° out-of-phase with the carrier or RF input signal at the terminal 10 and the carrier or RF output signal on terminal 36 is in-phase with the RF input signal. Because the differential amplifier circuit is operating within its linear range, the output signal is a sine wave and output harmonics are significantly reduced over known previous circuits. Because of the significant reduction in output harmonics, less output filtering is required. Further, the circuit produces a bi-phase modulated signal with excellent carrier suppression which has been measured (in the specific circuit described), to be better than 38 dB over a modulation frequency response of 100 bits per second to 125K bits per second that can be operated down to a modulation frequency of DC. Also, this performance did not degrade over a temperature range of −35° C. to +85° C.

Thus, an improved DC coupled bi-phase modulator is disclosed which has excellent carrier suppression and harmonics in the output are significantly reduced. Further, the number of parts required is reduced which, in conjunction with the use of IC chips, reduces the DC power requirements. Also, less output filtering is required and the temperature stability is improved.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A DC coupled bi-phase modulator comprising:
   (a) a switching circuit having a signal input and output, a bias input and a control input wherein the switching circuit is a differential amplifier circuit with the bias input being coupled to cause a first mode of operation when the amplitude of a signal at the control input exceeds the predetermined bias at the bias input and a second mode of operation when the amplitude of the signal at the control input is less than the predetermined bias;
   (b) comparing means having an output DC coupled to the control input of said switching means, a reference input coupled to the bias input of said switching means and a logic signal input; and
   (c) bias means coupled to the bias input of said switching circuit for providing a predetermined bias thereon.

2. A DC coupled bi-phase modulator as claimed in claim 1 wherein the signal output of the differential amplifier includes a pair of terminals, one of which is in-phase with a signal at the signal input and the other of which is 180° out-of-phase in the first mode of operation, and the one of which is 180° out-of-phase with the signal at the signal input with the other being in-phase in the second mode of operation.

3. A DC coupled bi-phase modulator as claimed in claim 2 wherein the comparing means includes an operational amplifier having an inverting and a non-inverting input.

4. A DC coupled bi-phase modulator as claimed in claim 3 wherein the operational amplifier is connected with the inverting input as the logic signal input and the non-inverting input connected as the reference input.

5. A DC coupled bi-phase modulator as claimed in claim 3 wherein the switching circuit has a linear range of operation.

6. A DC coupled bi-phase modulator as claimed in claim 5 wherein the operational amplifier is constructed to substantially maintain the amplitude of signals at the output thereof, in response to signals applied to the logic signal input, within the linear range of the switching circuit and varying about the predetermined bias applied to the reference input.

* * * * *